United States Patent [19]
Jayant et al.

[11] Patent Number: 5,559,900
[45] Date of Patent: Sep. 24, 1996

[54] COMPRESSION OF SIGNALS FOR PERCEPTUAL QUALITY BY SELECTING FREQUENCY BANDS HAVING RELATIVELY HIGH ENERGY

[75] Inventors: Nuggehally S. Jayant, Gillette; Robert J. Safranek, New Providence, both of N.J.

[73] Assignee: Lucent Technologies Inc., Murray Hill, N.J.

[21] Appl. No.: 667,851

[22] Filed: Mar. 12, 1991

[51] Int. Cl.$^6$ .................................................. G06K 9/36
[52] U.S. Cl. .................................. 382/248; 348/403
[58] Field of Search .......................... 382/56, 232, 239, 382/248; 381/36, 43; 348/403, 408, 438

[56] References Cited

U.S. PATENT DOCUMENTS

| | | | |
|---|---|---|---|
| 3,875,341 | 4/1975 | Gassmann | 381/36 |
| 3,894,190 | 7/1975 | Gassmann | 381/36 |
| 4,184,049 | 1/1980 | Crochiere et al. | 395/2 |
| 4,751,742 | 6/1988 | Meeker | 382/56 |
| 4,797,741 | 1/1989 | Sato et al. | 382/56 |
| 4,811,112 | 3/1989 | Rutledge | 358/430 |
| 4,817,812 | 3/1989 | Adelson et al. | 382/56 |
| 4,949,383 | 8/1990 | Koh et al. | 381/31 |
| 4,972,484 | 11/1990 | Theile et al. | 381/37 |
| 5,063,608 | 11/1991 | Siegel | 382/56 |
| 5,105,463 | 4/1992 | Veldhuis et al. | 381/37 |
| 5,113,256 | 5/1992 | Citta et al. | 382/56 |

OTHER PUBLICATIONS

"Transform Coding of Audio Signals Using Perceptual Noise Criteria", IEEE Journal on Selected Areas in Communications, vol. 6, No. 2, Feb. 1988, by J. D. Johnston.
"Optimizing Digital Speech Coders by Exploiting Masking Properties of the Human Ear", Journal of the Acoustical Society of America, Dec. 1979, pp. 1647–1652, by M. R. Schroedr, B. S. Atal and J. L. Hall.
"Sub–Band Coding of Images Using Vector Quantization", Proc. of Seventh Benelux Information Theory Symposium, pp. 143–150, 1986, by P. H. Westerink et al.
"Cosine Transform Coding Incorporation Human Visual System Model", SPIE vol. 707, Visual Communications and Image Processing (1986), pp. 165–171, by K. N. Ngan et al.
"A Fast Cosine Transform in One and Two Dimensions", IEEE Trans. Acoustics, Speech and Signal Processing, C. ASSP–28, No. 1, Feb. 1980, pp. 27–34, by J. Makhoul.
"The Design of Uniformly and Nonuniformly Spaced Pseudo Quadrature Mirror Filters", IEEE Trans. ASSP, vol. ASSP–34, No. 5, Oct. 1986, pp. 1090–1096, by R. V. Cox.
"Sub–Band Coding of Images", IEEE ASSP, vol. 34, No. 5, Oct. 1986, pp. 1278–1288, by J. Woods and S. D. O'Neil.
"Asymmetry of Masking Between Noise and Tone", Percept. and Psychophys., vol. 11, pp. 241–246, 1972, by R. P. Hellman.
"Model of human visual–motion sensing", J. Opt. Soc, Am.A, vol. 2, No. 2, Feb. 1985, A. B. Watson and A. J. Ahumada, Jr., pp. 331–342.
"Spatial and Temporal Contrast–Sensitivity Functions of the Visual System", J. Opt. Soc. Am. vol. 56, J. G. Robson, Aug. 1966, pp. 1141–1142.

*Primary Examiner*—Leo Boudreau
*Assistant Examiner*—Andrew W. Johns
*Attorney, Agent, or Firm*—Henry T. Brendzel

[57] ABSTRACT

Compression of signals is achieved through a simple decision of whether or not to encode certain frequency bands; not how well to encode all of the frequency bands. Based on the input signal and on a preselected perceptual model, a "just noticeable difference" (jnd) noise spectrum is computed. This spectrum is applied to a selector where it is used in the decision to select a chosen number of frequency bands of the input signal. The bands selected are the bands with the greatest energy relative to the jnd energy in the same band. Each of the selected bands is encoded and transmitted to the receiver. Both analog and digital realizations are presented.

16 Claims, 3 Drawing Sheets

COMPRESSION OF SIGNALS FOR PERCEPTUAL QUALITY BY SELECTING FREQUENCY BANDS HAVING RELATIVELY HIGH ENERGY

BACKGROUND OF THE INVENTION

This invention relates to signal processing and more particularly to encoding of signals for efficient transmission and storage.

The processing of signals for transmission often includes sampling of the input signal, quantizing the samples and generating a set of codes that represent the quantized samples. Most signals of interest (e.g., such as in speech or video signals) are highly correlated, which means that the signal can be thought of comprising a predictable component and an unpredictable component. Coding compression is achieved by encoding essentially only the unpredictable component. Moreover, since these signals are often destined to be received and perceived by humans, concepts that relate to the human perception of the information received have been employed to further compress the coding of such signals and, consequently, the rate of the transmitted signals.

In connection with both speech and video signals, the prior art coding approaches that most closely relate to this invention are transform coding and linear predictive coding.

In a communications system utilizing transform coding, the signal is divided into segments. The segments are sampled and the samples of a segment are transformed into a set of frequency domain transform coefficients. The coefficient signals are then quantized and applied to the transmission channel. In systems that account for noise perception characteristics, the quantization mode applied to the coefficients is made to depend on the signal characteristics and on the sensitivity of the recipient to the resulting quantization noise, achieving thereby coding efficiency. Superimposed on those considerations is the limited bandwidth that is available. Bit allocation is one approach for handling the available bandwidth. In this approach, bits are allocated to the encoding of the transform coefficients in a manner that attempts to achieve a constant bandwidth. Examples of transform coding are found, among others, in U.S. Pat. No. 4,949,383, U.S. Pat. No. 4,184,049, an article by J. D. Johnston titled "Transform Coding of Audio Signals Using Perceptual Noise Criteria", IEEE Journal on Selected Areas in Communications, Vol. 6, No. 2., February 1988, etc.

Linear predictive coding in the speech environment dates back to the mid 1960's. The article by B. S. Atal and M. R. Schroeder titled "Predictive Coding of Speech Signals", Proceedings of the 1967 Conference on Communications and Processing, Cambridge, Mass., pp 360–361, is an early example of that. Later, it has been recognized that predictive coding may be improved by taking account of the not unlimited ability to perceive noise. For example, the article by M. R. Schroeder, B. S. Atal and J. L. Hall titled "Optimizing Digital Speech Coders by Exploiting Masking Properties of the Human Ear", Journal of the Acoustical Society of America, December 1979, pp 1647–1652, describes the benefits that may accrue from considering the perceptual characteristics of the human ear.

In Linear Predictive Coding (LPC) that accounts for the perception of noise, a signal segment is predicted from historical information, and an error signal is derived by subtracting the predicted signal from the actual signal. The error signal is typically transformed and weighted by a noise-perception frequency-sensitive function, to result in a modified transform. The modified transform is encoded and transmitted to the receiver.

In the area of video signals the situation is not dissimilar. For example, sub-band coding was applied to image signals by J. Woods and S. D. O'Neil in "Sub-Band Coding of Images", IEEE ASSP, Vol 34, No. 5, October 1986, pp 1278–1288. The arrangement proposed by Woods et al. divides the image into two-dimensional frequency bands and the signal of each band is compressed via DPCM. Two-dimensional frequency bands, in effect, measure the signal variability in the two dimensions that form the image. Vector quantization of video is described, for example, in "Sub-Band Coding of Images Using Vector Quantization" by P. H. Westerink et al., Proc. of Seventh Benelux Information Theory Symposium, pp. 143–150, 1986; and in U.S. Pat. No. 4,811,112 issued to C. W. Rutledge on Mar. 7, 1989. The "human visual system" (HVS) characteristics were incorporated by K. N. Ngan, et al. in an article titled "Cosine Transform Coding Incorporating Human Visual System Model", SPIE Vol 707, Visual Communications and Image Processing (1986) pp. 165–171. The system described by Ngan et al. basically executes a two-dimensional cosine transform on the source information and weights the derived coefficients in accordance with an HVS function. The weighted coefficients are then quantized, coded and sent to a buffer prior to being applied to the transmission medium. To insure a desired global bit rate, a buffer fullness indication is fed back to the quantizer to control the number of bits that are generated by the quantizer. More recently, is a co-pending application Ser. No. 07/350435, filed May 4, 1989, J. D. Johnston and R. J. Safranek disclosed a sub-band analysis method where the quantization schema for each pixel is adapted so that the amount of quantizing nose that is produced is near, but below, the limit of perceptibility. By allowing the quantization noise to rise while still keeping it below perceptibility, greater compression of the signal is achieved.

The above-described coding approaches operate with sampled and quantized signals. To achieve a more compressed code, prior art approaches typically transform the signal to the frequency domain and thereafter operate in that domain. Given a fixed bandwidth, they allocate the available bits between the different frequency components to do as good a job as possible on all of the frequency components or on a prespecified number of them. In other words, the decision that is made is how well to encode the frequency coefficients; not whether to encode them in the first instance. The result is an encoding schema that is more complex than necessary and, when the total bit rate is constrained, is perceptually suboptimal.

SUMMARY OF THE INVENTION

The underlying principle of this invention recognizes that good performance is achieved through a simple decision of whether or not to encode 5 certain frequency bands; not how well to encode all or a prescribed number of the frequency bands. Recognizing that an analog signal has a baseband frequency spectrum, and that corresponding to the signal's frequency spectrum there is a "just noticeable difference" (jnd) noise spectrum, it is clear that since signal frequency bands that dip below the jnd spectrum cannot be perceived anyway there is no need to transmit those frequency bands. Furthermore, when the available bandwidth is limited, it makes sense to concentrate on transmitting only those of the signal's frequency bands that most exceed the jnd spectrum.

In accordance with the principles of this invention, the jnd spectrum is applied to a decision circuit that selects a number of frequency bands of the signal to be encoded. Each of the selected bands is encoded and transmitted to the receiver.

In one embodiment, for example, the analog input signal is separated into bands through a transform circuit which, in effect, is a bank of bandpass filters. The jnd level within each band is evaluated and a quotient signal is developed for each band which corresponds to the input signal in the band, divided by the jnd signal in the band. A selection circuit identifies the n bands having the highest quotient, and when an analog signal transmission is desired, an inverse transform develops n analog signals which are modulated to form a baseband having a contiguous spectrum. The baseband signal is then directly modulated onto a carrier. When digital transmission is preferred, the outputs of the selection are formatted and applied to the transmission medium.

DETAILED DESCRIPTION

A band-limited time varying signal can be represented by a finite frequency spectrum. Typically, the spectrum is very jagged within the band because information-laden signals don't generally contain the entire spectrum of frequencies. When bands of signals are considered a form of averaging occurs and the spectrum of such a signal is less jagged, so it may have a contour like the one depicted by curve 10 in FIG. 1 (also denoted by the letter S). Curve 10 may represent, for example, a speech signal. A noise signal (one that sounds like noise when it is an audio signal, or looks like a salt and pepper mixture when it is a video signal) typically contains all of the possible frequency components, and has a frequency spectrum that varies very slowly with frequency. A flat spectrum contour is typically referred to as "white noise".

Researchers have established that there exists a threshold below which a noise signal cannot be perceived by most people. This threshold varies with frequency. Because of masking properties, this threshold also varies with the spectrum of the information signal that exists in the presence of the noise signal. This masking phenomenon is well known even to lay people. Noise-like artifacts in an image of a blank wall are easily detected, whereas the same artifacts in an image of a jungle are not detected.

Figure 1:
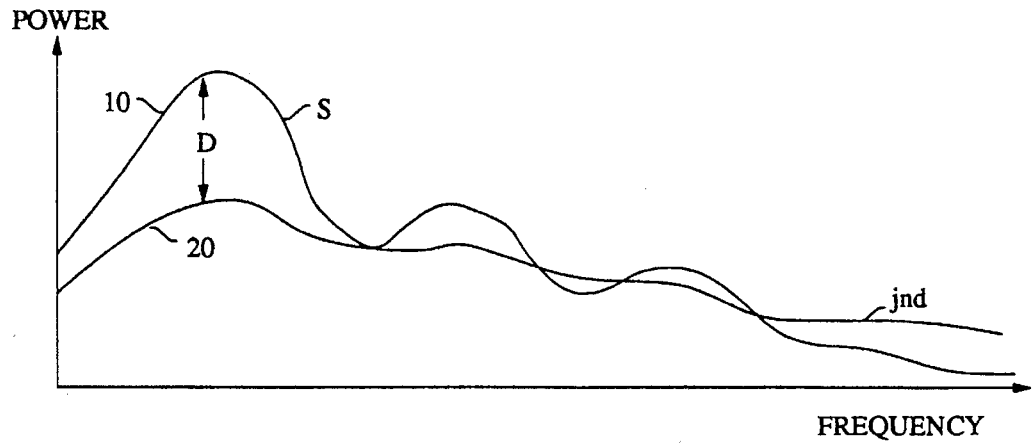
FIG. 1 illustrates the spectrum of a signal and the spectrum of noise that might be barely perceived in the presence of the signal.

The exact relationship of the detectable noise to the information signal is not important to the principles of this invention, so only an illustrative relationship is depicted in FIG. 1. Curve 20 in FIG. 1, also denoted by jnd, illustrates the variation in the noise threshold as a function of frequency (the jnd spectrum), for the speech signal represented by curve 10. D in FIG. 1 denotes the energy difference between the speech signal and the perceived noise threshold. Actually, the ordinate of the FIG. 1 graph has a log scale, so the depicted difference signal D is really a log of the quotient S/jnd.

As indicated above, jnd spectrum, is employed in the prior art merely as a means for modifying, or weighting the frequency coefficients of S, prior to coding of the modified spectrum. Through bit allocation and/or through quantization mode control (control of the number of bits used to quantize the signal) artisans have attempted to do the best job possible in encoding the modified frequency coefficients.

In accordance with the principles of this invention, in contradistinction, the jnd spectrum enters into the decision of whether or not to encode the frequency bands; not how to encode them. Additionally, the encoding of this invention is adapted to achieve a constant perceived quality encoding process.

In accordance with the principles of this invention, the spectrum of the signal to be encoded is divided into N frequency bands, and a jnd spectrum is computed and applied to a decision means that selects n out of the N bands. Both N and n are parameters that are under designer control. The resulting compression ratio is N/n, which means that for a given N, a smaller value of n yields a greater level of compression. Of course, a greater level of compression also results in lower fidelity at a receiver that is connected to the transmission medium. It can be shown that for a given ratio n/N, the fraction of the retained energy is greater for larger values of N (a finer and hence better selection is made of the peaks in the signal's spectrum). On the other hand, the value of N may be limited by the amount of hardware that the designer is willing to specify.

Whereas the principles of this invention can be implemented with analog circuits (or at least analog circuits and some switching, or sampling), in recognition of the fact that digital implementations predominate today's designs, the following discussion presents a digital embodiment.

Figure 2:
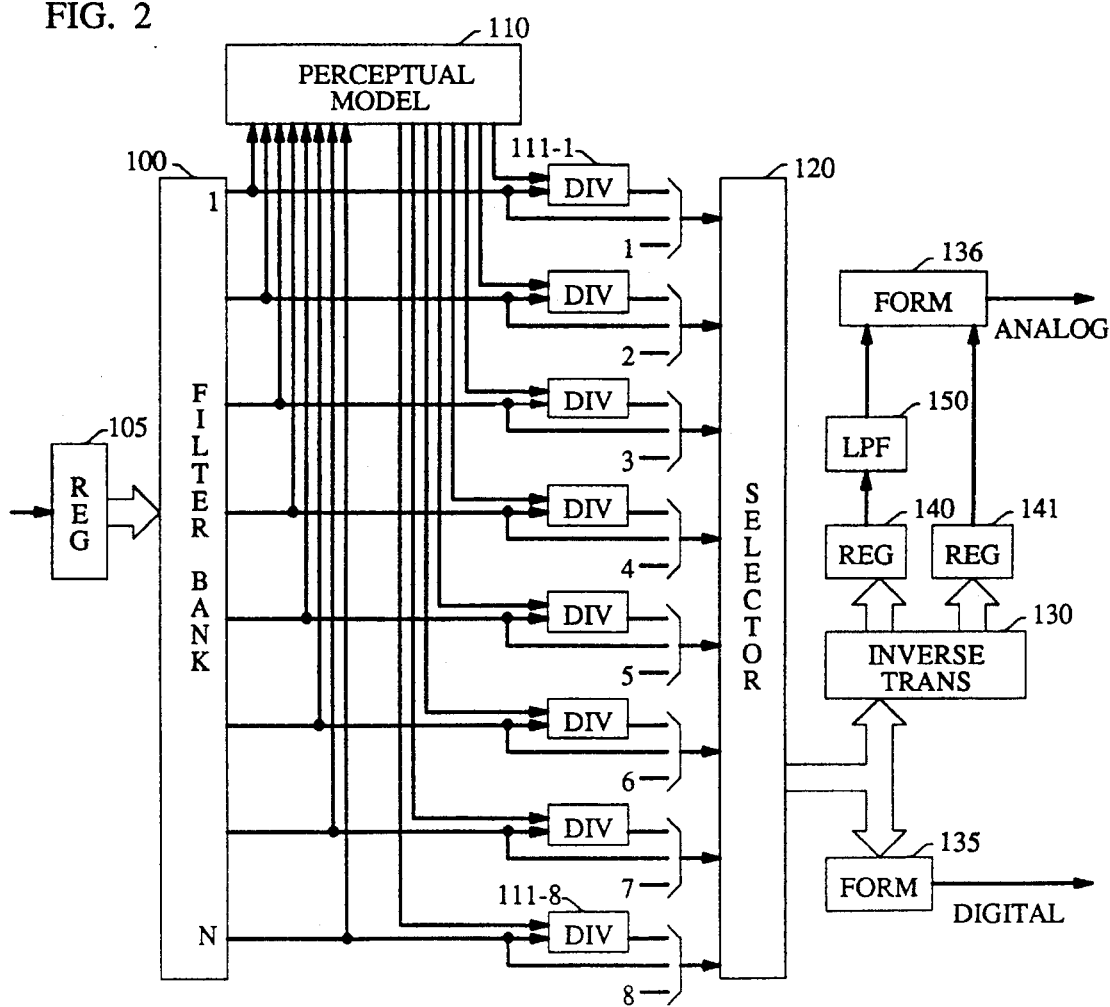
FIG. 2 presents the architecture of a coder/transmitter in conformance with the principles of this invention.

In FIG. 2, the input signal is assumed to be a train of samples. This input signal is applied to analysis filter bank 100 via a serial to parallel register 105. Filter bank 100 receives a set of input signal samples with the arrival of every N samples at register 105 and develops therefrom N frequency coefficients. Filter bank 100 may be implemented in a number of ways, such as with a cosine transform circuit, or with generalized quadrature mirror filters (GQMF). See, for example, J. Makhoul, "A Fast Cosine Transform in One and Two Dimensions," IEEE Trans. Acoustics, Speech and Signal Processing, C. ASSP-28, No. 1, February 1980, pp 27–34; and R. V. Cox "The Design of Uniformly and Nonuniformly Spaced Pseudo Quadrature Mirror Filters", IEEE Trans. ASSP, Vol. ASSP-34, No. 5, October 1986, pp. 1090–1096.

The output of filter bank 100 is applied to perceptual model block 110. The function of block 110 is to develop the jnd band signals of FIG. 1. The manner in which those signals are generated is strictly a function of the perceptual model selected and, in fact, while FIG. 2 shows block 110 to be responsive to the output of filter bank 100, it should be appreciated that some perceptual models may call for a connection between the input to bank 100 and the input to block 110, in addition to, or instead of, the connection of the output of bank 100 to block 110.

The concept of a perceptual sensitivity to noise has been studied by a number of researchers. See, for example, R. P.

Hellmans, "Asymmetry of masking between noise and tone," Percept. and Psychophys., Vol 11, pp. 241–246, 1972. Another article that is very informative is "Transform Coding of Audio Signals Using Perceptual Noise Criteria," by J. D. Johnston, IEEE Journal on Selected Areas in Communications, Vol 6, No. 2, February 1988, pp 314–323. Building on this information, in a copending application titled Perceptual Coding of Audio Signals, Ser. No. 07/423,088, filed Oct. 18, 1989, one actual coder design is disclosed which includes a means for developing the threshold values; i.e., a perceptual model 110. The teachings of this application are hereby incorporated by reference, as if they were detailed herein verbatim. For sake of completeness, however, a FORTRAN program is included herein and summarized below, which develops the outputs of perceptual coder 110 as taught by the incorporated application. A useful reference for understanding the FORTRAN program is FX/FORTRAN Programmer's Handbook, Alliant Computer Systems Corp., July 1988. Tables 1 and 2 present a list of constants used in connection with the illustrative program of Listing 1, such as the absolute thresholds used and the band definitions.

The program comprises primarily the "strt" routine and the "calcthri" routine. The "strt" routine is called initially to calculate various parameters. The "calcthri" routine is called thereafter, with every new block of sampled data, and it develops the output set labeled "ratio". This output set is actually representative of the ratio S/jnd for the different defined frequency bands and it eliminates the need for the separate dividers that are shown in FIG. 2. Noting that the listing's final step in developing the "ratio" is a division (as expected), and that divisions are time consuming, a better realization employs hardware dividers as shown in FIG. 2.

As indicated above, the FORTRAN program included herein computes the $$\frac{S}{jnd}$$

measure of sensitivity to the perception of noise. Other measures can also be employed, such as $$\frac{(S-jnd)^2}{jnd}, \frac{|S-jnd|}{jnd},$$

or the logarithm of any of the above.

FIG. 2 illustrates an embodiment where, as suggested above, the ratio $$\frac{S}{jnd}$$

in implemented with hardware dividers. Thus, in FIG. 2 the signal of coefficient i where i=1,2 . . . N, at the output of filter bank 100 (i.e., signal $S_i$) is divided in circuit 111-i by the jnd output of block 110 that corresponds to coefficient i (i.e., signal $jnd_i$), to develop thereby a quotient signal $q_i$. Circuits 111-i are identical read-only lookup tables that develop the quotient signal. With an 8 bit $S_i$ and an 8 bit $jnd_i$, each lookup table is merely a $2^{16}$ memory. (If time permits, a single memory can be shared.) The output of each of the divider circuits and its associated $S_i$ signal is applied to selector circuit 120. The identity, i, of each signal is also applied to circuit 120. Circuit 120 thus receives N triplets of signals, and its function is to select the n signals $S_i$ (and their identities) that are associated with the n largest quotient signals $q_i$. The identity information is typically referred to as "side information". As will become apparent hereinafter, this information must be sent to the receiver.

In a digital environment, the signals chosen by selector 120 and their identities are formatted (and perhaps further encoded) in formatter 135 and transmitted to a remote receiver. This is depicted in FIG. 2 by the line marked "DIGITAL". The formatting may be done in a number of ways. One way is to send the information in the form of packets. That is, each signal identity is placed in a header field, and the corresponding coefficient signal is placed in the immediately following data field.

There are situations, however, where it is desirable to employ an analog transmission medium. In such a case, it is useful to convert the coefficients chosen by selector 120 to a narrow band analog signal with a bandwidth that reflects the compression achieved by the system.

The latter is achieved in the FIG. 2 circuit with inverse transform circuit 130, a parallel to serial register pair 140 and 141, a low pass filter 150, and a formatter 136. Most advantageously, inverse transform circuit 130 is of the type used to realize the transform circuit of bank 100, except that it needs to respond only to sets of n inputs rather than to sets of N inputs. It develops n signals which correspond to time samples. Those time samples are shifted out serially through register 140 and filtered to excise the high frequency components with low pass filter 150. Of course, the clock of register 140 is N/n times slower than the clock of register 105. The developed baseband analog signal is applied to formatter 126 where it is modulated onto a carrier in preparation for transmission. Concurrently, the side information is shifted out to formatter 126 through register 141 where it is encoded, via pulse amplitude modulation, for example, to develop a second analog signal that is modulated onto a carrier in preparation for transmission. The analog transmission is depicted in FIG. 2 by the line marked "ANALOG". It is expected, of course, that either one of the two modes (analog or digital transmission) will be employed. Both are shown in FIG. 2 merely for illustrative purposes.

Figure 3:
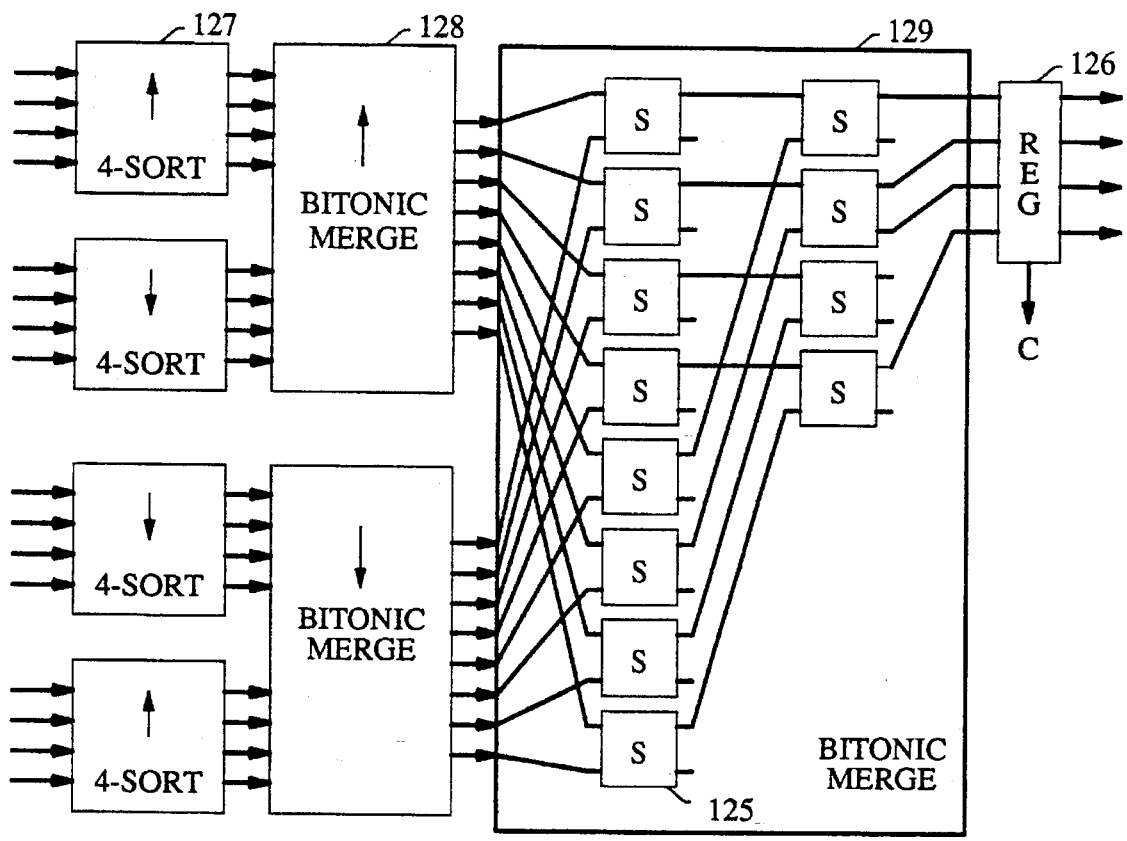
FIG. 3 details the structure of selector 120 of FIG. 2.

FIG. 3 depicts one implementation for selector circuit 120. It is based on the Batcher network. See, for example, U.S. Pat. No. 3,428,946 issued Feb. 18, 1969. In that patent, Batcher explicitly teaches how to sort arbitrarily arranged sets of four inputs and eight inputs. He also taught how to merge two bitonic sequences into a single sorted sequence. Applying these teachings directly, FIG. 3 includes four 4-input sort networks 127 and two bitonic merge networks 128. They are arranged to form a bitonic of sequence of length 16 where the top eight inputs are descending in the sort key (the $q_i$ values) and the bottom eight inputs are ascending in the sort key. These networks are structured according to the teachings of Batcher, using switches 125 as described below. The bitonic sequence developed by networks 128 is applied to a modified bitonic merge network 129. Unlike bitonic merge network 128 which contains a $\log_2 M$ number of stages, where M is the number of inputs of the network, the number of stages in merge network 129 is $\log_2(M/n)$. In FIG. 3, where n is 4 and M=N=16, the number of stages is $\log_2(16/4)$ or 2. Also, because many of the outputs are not utilized, each of the switches 125 within merge network 129 can be simplified, compared to the canonic design of switches 125 within networks 127 and 128.

Figure 4:
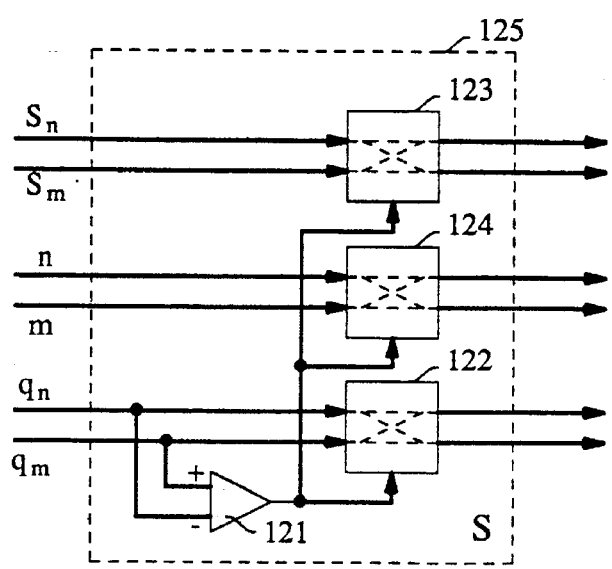
FIG. 4 presents the schematic diagram of a switch used in selector 120.

The structure of switch 125 is presented in FIG. 4. Each switching block 125 receives two input coefficient signals $S_m$ and $S_n$, the corresponding two quotient signals $q_m$ and $q_n$ and the signal identity values m and n. The function of each switching block 125 is to ascertain which quotient signal is larger and to route that quotient signal, its corresponding coefficient signal, and the identity value, to a selected one of two outputs of three respective switch elements. This is accomplished with a subtractor 121 that is responsive to the quotient signals and with three "double pole - double throw" switch elements 122, 123 and 124 that are responsive to the output of subtractor 121. Switch 122 routes the quotient signals, switch 123 routes the coefficient signals and switch 124 routes the identity values. It may be noted that at the last stage of selector 120, the quotient signals need not be routed because no further decisions need to be made. Also, when $\log_2 N/n$ stages are employed in network 129, the n outputs of the network are not ordered; they are only guaranteed to be the ones that correspond to the signals with the largest quotient signals.

Needless to say, the timing of the selection process of circuit 120 must be controlled. It is not useful; for example, to allow circuit 120 to effect a different selection too frequently. Each selection provides a new set of side information that must be sent to the receiver, and that overhead should be kept to a minimum. Accordingly, selector circuit 120 includes a register 126 at the output of network 129 that is used to capture and store each selection. The question is what schema to apply to the clock of register 126. The simplest approach is to use a constant clock. This provides a constant bandwidth to the side information. The clock can be a $N^{th}$ sub-multiple of the sampling clock of the input signal, or perhaps a $KN^{th}$ sub-multiple of the sampling clock of the input signal, where K is an integer. A third alternative uses a small value of K (perhaps even K=1) and at each appearance of the clock a decision is made as to whether or not a sufficient benefit results from changing the selection. This can be done with conventional circuitry (not shown in FIG. 3) that measures the ratio of the selected quotient signals to the unselected quotient signals. By comparing the ratio of the selections at the output of selector 120 to the ratio of the selections at the input of selector 120 a decision whether or not to allow a change in the selection can be made based on the observed difference in the ratios.

Figure 5:
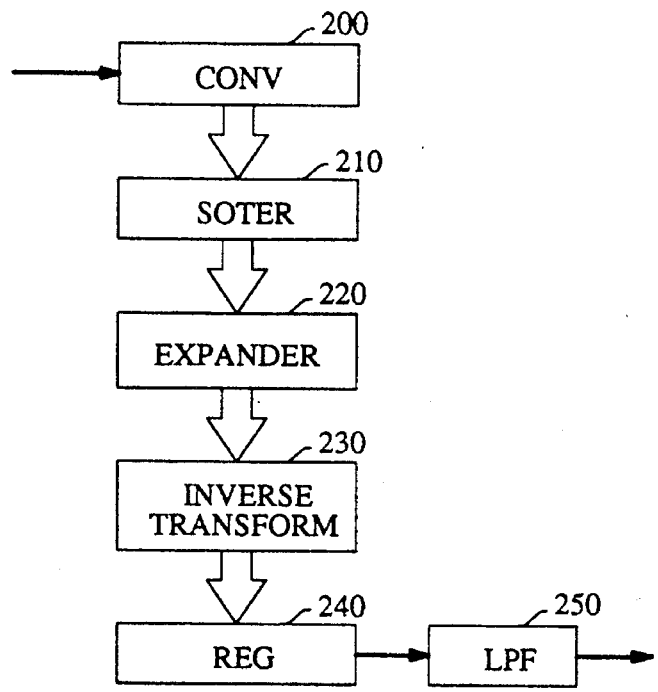
FIG. 5 presents the structure of a decoder/receiver adapted to the signals developed by the coder/transmitter of FIG. 2.

FIG. 5 depicts a receiver in conformance with the digital transmission approach of the FIG. 2 transmitter. Since it receives sets of n packets that are not necessarily sorted by frequency, the input signals are applied to a serial to parallel converter 200 which, while keeping each packet in serial form, applies the n packets, in parallel, to sorter 210. Sorter 210 sorts its input signals based on the header field, which identifies the frequency coefficients. The sorted outputs are applied to expander network 220 which routes the signals to appropriate outputs of the expander network. Sorter 210 may be a batcher network, as described above, except that the sorting is keyed to the identifier, i, and not on the quotient signals $q_i$. Expander network 220 may be a shuffle exchange network as described, for example, is U.S. Pat. No. 4,516,238 issued to A. Huang and S. C. Knauer on May 7, 1985.

It may be noted in passing that the selection process carried out by selector circuit 120 is tantamount to a selection of frequency bands and a down-shifting to baseband of the selected frequency bands. The operation of sorter 210 is a sorting of the selected bands, and the operation of expander 220 is tantamount to an up-shifting of the sorted frequency bands to their appropriate place.

The output signals of expander 220 are applied to inverse transform circuit 230. Circuit 230 is akin to circuit 130, except that it is responsive to N inputs (although only n of them are non-zero) rather than to n inputs. The N outputs of inverse transform circuit 230 are serially shifted out via parallel to serial register 240 and filtered through low pass filter 250 to yield the final reconstructed signal.

For sake of simplicity the above description concentrates on "one dimensional" signals, such as speech. It should be clearly understood, however, that the principles of this invention apply quite well to higher dimensional signals. With video signals, for example (which can be thought to be two dimensional), the only change that needs be made is in filter bank 100, in inverse transform circuits 130 and 230, and in the perceptual model circuit 110. The modifications that relate to the two-dimensional aspects of video signals are described in the aforementioned U.S. Ser. No. 07/350, 435 application. Both the perceptual model and the two-dimensional transform processes are described.

Figure 6:
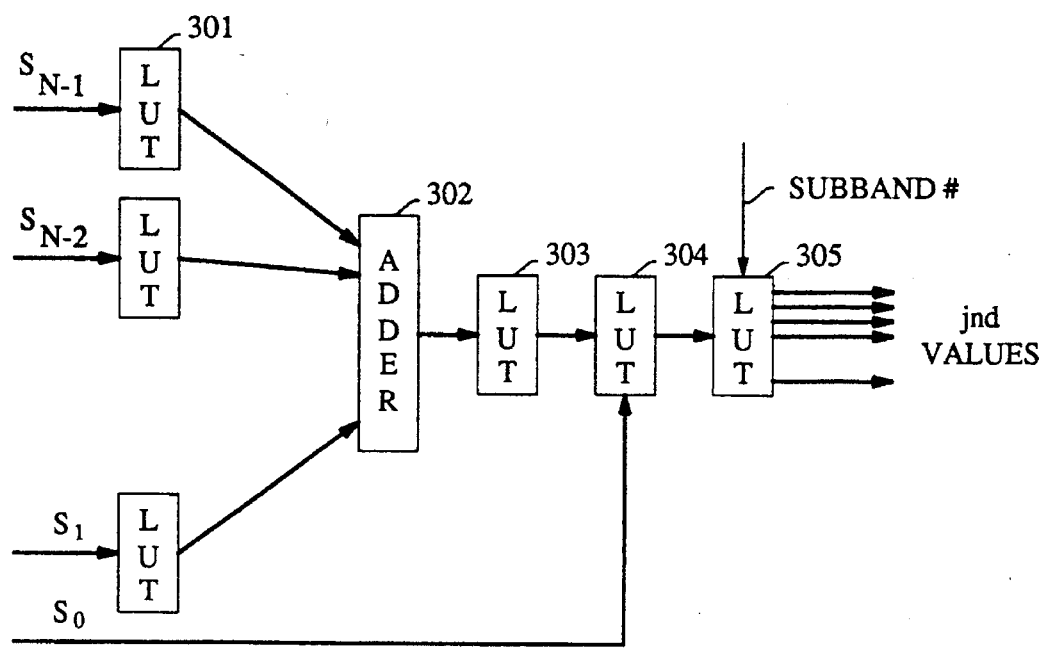
FIG. 6 presents one embodiment for developing the jnd values in an video signal environment.

Again, for sake of completeness, the following describes in summary form one embodiment for perceptual model 100 in the video environment. In FIG. 6, N inputs are received from filter bank 100. One of them represents the band where the two dimensional "dc value" of the frame is found. All bands other than dc value band are applied to lookup tables 301. Each of the lookup tables develops a weighted measure of the power in the band. That is, each of the lookup tables develops a value of $k_i S^{2i}$ where $k_i$ may be different for different values of i. The computed weighted power measures represent an estimate of the visual "texture" of the image at that frequency band. Adder 302 sums the "texture" outputs of the N–1 tables 301 to produce an overall texture estimate. That estimate is applied to lookup table 303 which transforms the power domain output of adder 302 to an amplitude domain masking threshold. The mapping function within table 303 is a log-like function, which reduces the dynamic range at the output of table 303. A brightness correction is introduced in lookup table 304, which multiplies the input from table 303 by the "dc value" band. Lastly, lookup table 305 multiplies the masking threshold developed by table 304 by a set of constants, where each constant is related to the noise sensitivity of the human visual system in each of the frequency bands. The N outputs thus developed form the set of outputs that are applied by perceptual model 100 to dividers 111 in FIG. 2.

Extension to three dimensional cases, such as a time succession of video signal frames or a three-dimensional topographical map, is also straight forward in accordance with the well known principles by which the extension is made from one dimension to two dimensions.

| LISTING 1 |
|---|
| subroutine strt(rzotz) |

```
c     rzotz is sampling frequency. It can be varied
c     over the 44.1 to 48 range with the same absolute
c     threshold tables.
c     iblen is the total transform length, i.e. 2*freq
c     length sets up threshold generation tables, ithr and bval
      real freq(0:26)/0.,100.,200.,300.,400.,510.,630.,770.,
     1 920.,1080.,1270.,1480.,1720.,2000.,2320.,2700.,
     1 3150.,3700.,4400.,5300.,6400.,7700.,9500.,12000.,15500.,
     1 19200.,25000./
c     this list can be changed.
      common/sprd/spdf(100,100)
c     this is the precalculated spreading function
      common/codepar/ipar(0:512,2),npart
c     this is the coder partitions. the first entry is the
c     upper edge, the second is 0 for minimum and 1 for sum
      common/win/wind(1024)
c     window storage for local (to threshold calc) fft
      common/thresh/ithr(27),bval(513),rnorm(513)
c     ithr(i) is index of critical band i. bval is bark index
c     of each line, rnorm is dc gain adjustment for sprdngf
```

LISTING 1

```
        common/absthr/abslow(513)
c       absolute threshold values
        common/uniqid/hold(1024)
c       storage for calcthri
        common/sigs/ifirst
c       see calcthri
        common/blk1/othr(513)
        common/shrtcnv/iledge(100),iuedge(100),sbval(100),itp
        common/shrtnrm/snorm(100)
c       setup variables for shortened convolution
c       iledge is lower edge of shortened spectrum set
c       iuedge is upper edge
c       sbval is barkval of mean
c       itp is the largest number for which iledge, etc are valid
c       do i=1,1024,1
c       wind(i)=sin((i-.5)/1024*3.14159265358)
c       end do
c       above is window for DCT. Follows is Hann window
        do i=1,1024,1
        wind(i)=.5-.5*cos(i/1025.*2.*3.141592653)
        end do
        ipar(0,1)=2
        ipar(0,2)=0
        i=1
c       openas is an Alliant-supplied simplified version of the
c       conventional "open" statement of FORTRAN.
        call openas(0,'coderparam',0)
67      read (0,*,end=66) ipar(i,1),ipar(i,2)
        if ( (ipar(i,1) .lt. 2) .or. (ipar(i,1) .gt. 513) ) then
        write(*,*) 'bad first coderparam! i=',i,'ipar=',ipar(i,1)
        stop
        end if
        if ( (ipar(i,2) .ne. 0) .and. (ipar(i,2) .ne. 1) ) then
        write(*,*) 'bad second parameter i=',i,'ipar=',ipar(i,2)
        stop
        end if
        npart=i
        i=i+1
        if ( i .gt. 513 ) then
        write (*,*) 'bad param file'
        stop
        end if
        goto 67
66      continue
        do i=1,1024,1
        hold(i)=0
        end do
c       zero storage array
        abselv=120
c       this sets absolte level, may be changed in
c       different situations
        abselv=abselv-96.
c       first line sets absolute level in DB spl for
c       +-32767 Second is related to formula below
        xfmnorm=.5e6
c       xfmnorm is the largest line radius at +-32760 sinewave
c       input
        xfmnorm=8199487.
        iblen=512
        do i=1,iblen+1,1
        abslow(i)=xfmnorm*xfmnorm/exp(9.6*alog(10.))
c       1 * iblen*float(iblen)*4./512./512.
        end do
c       the .5e6 is a magic number for our transform. Means
c       the value of the biggest line, ever, when input is
c       +-32767 sinewave
        ifirst=0
        fnyq=rzotz/2.
c       nyquest frequency of interest.
        ibp1=iblen+1
c       write(*,*) 'ibp1',ibp1,iblen
        ithr(1)=2.
        i=2
10      ithr(i)=freq(i-1)/fnyq*float(iblen)+1.
        i=i+1
        if (freq(i-1) .lt. fnyq) goto 10
c       sets ithr to bottom of cb
        do j=i,27,1
        ithr(j)=ibp1
        end do
c       sets unused critical bands to something that makes
c       other stuff not blowup. One should never access these
c       values, though. in general, only occurs at low sampling
c       rates
c       now, set up the critical band indexing array
        bval(1)=0
c       first, figure out frequency, then ...
cc      write(*,*) 'ipb1',ibp1
        do i=2,ibp1,1
        fre=float(i-1)/float(iblen)*fnyq
c       write(*,*) i,fre
c       fre is now the frequency of the line. convert
c       it to critical band number.. ecch ...
        do j=0,25,1
        if (fre .gt. freq(j) ) k=j
        end do
c       so now, k = last CB lower than fre
        rpart=fre-freq(k)
        range=freq(k+1)-freq(k)
        bval(i)=k+rpart/range
        end do
c       bval is set, now setup uedge and ledge
        iledge(1)=1
        iuedge(1)=1
        sbval(1)=bval(1)
cc      write(*,*) 'i=1,j=1',sbval(1),iledge(1),iuedge(1)
        rwidth=.33
c       you can set up the length of convolution you want
c       with rwidth. The bigger rwidth, the less accurate
c       the threshold, and the faster you can calculate
c       it.
        i=2
c       i is sb counter
        j=2
c       j is bval counter
13      iledge(i)=j
        if ( (bval(i)-bval(i-1)) .gt. rwidth ) then
        sbval(i)=bval(i)
        iuedge(i)=j
cc      write(*,*) i, j,sbval(i),iledge(i),iuedge(i)
        j=j+1
        i=i+1
        goto 13
        end if
c       if range is still too narrow. Now, range is OK,
c       so increment j until it's not.
313     if ( j .eq. ibp1 ) then
        iuedge(i)=j
        itp=i
        sbval(i)=(bval(iledge(i))+bval(iuedge(i)))/2.
cc      write(*,*) i, j,sbval(i),iledge(i),iuedge(i)
        goto 1313
        end if
c       that's for when you get to the top edge
        if ( (bval(j) - bval(iledge(i)) ) .le. rwidth) then
        j=j+1
        goto 313
        end if
c       not wide enough, increment
        iuedge(i)=j
        sbval(i)=( bval(iledge(i))+bval(iuedge(i)))/2.
cc      write(*,*) i, j,sbval(i),iledge(i),iuedge(i)
        j=j+1
        i=i+1
        goto 13
1313    continue
c       the above mess automagically sets up the upper and lower
c       edge arrays. Clearly, only one is absolutely necessary,
c       if you want to get rid of one.
        do i=1,itp,1
        tmp=0.
        do j=1,itp,1
        tmp=tmp+sprdngf(sbval(j),sbval(i))
        end do
        snorm(i)=1./tmp
        end do
```

LISTING 1

```
              if ( iblen .eq. 512) then
              call openas(0,'/usr/jj/iso/src/vartry/proto/lfreqlist',0)
              else
              write(*,*) 'no freqlist for ',iblen
              stop
              end if
              do i=2,ibp1,1
              if (iblen .eq. 512) read(0,*) db
              db=exp((db-abslev)/10.*alog(10.))
      c       write(*,*) i,db
              abslow(i)=abslow(i)*db
              end do
      c       the above reads in and converts the absolute threoshlds
      c       you an make this room in realtime
      c       the values in the file are approximate. Those with
      c       real information might reconstruct the file or table
      c       as appropriate
              do i=1,npart,1
              if (ipar(i,2) .eq. 1) then
              tmp=1e20
              do j=ipar(i-1,1)+1,ipar(i,1),1
              if ( abslow(j) .lt. tmp ) tmp=abslow(j)
              end do
              do j=ipar(i-1,1)+1,ipar(i,1),1
              abslow(j)=tmp
              end do
              end if
              end do
      c       this makes the lowest absthr the valid one in any
      c       coder frequency partition.
      cc      write(*,*) 'lowest level is ', sqrt(abslow(90))
              do i=1,iblen+1,1
              othr(i)=1e20
              end do
      c       setup for preecho concerns
      c       now, precalculate spreading function
              do i=1,itp
              do j=1,itp
              spdf(i,j)=sprdng(sbval(j),sbval(i))
              end do
              end do
              return
              end
              subroutine calcthri(xtmp,ratio,iblen)

c       iblen is length of shift, i.e. length spectrum
      c       xtmp is the input data of length iblen
      c       ratio( ) is the energy to mask ratios
              real r(513),phi(513),xtmp(1024),pe,calcpe
      c       r is current radius
      c       phi is current phi
      c       xtmp is current data block, real signal
      c       thr is threshold
      c       outputs preecho flagging.
              real rt(513),sbeta(100),sthr(100)
      c       temporary variables
              real bmax(27)/20.,20.,20.,20.,20.,17.,15.,
             1 10.,7.,4.4,4.5,4.5,4.5,4.5,4.5,
             1 4.5,4.5,4.5,4.5,4.5,4.5,4.5,4.5,4.5,
             1 3.5,3.5,3.5/
      c       bmax is a minimum snr that you must have in each
      c       critical band under stereophonic conditions with
      c       dual monophonic coders. This situation is relaxed
      c       substantially with stereo coding(1+r, 1-r), as
      c       the noise follows the signal and
      c       the array is referenced in barks, with element
      c       27 "just in case" somebody puts a high sampling freq
      c       through.
              common/sprd/spdf(100,100)
      c       this is the precalculated spreading function
              common/codepar/ipar(0:512,2),npart
      c       this is the coder partitions. the first entry is the
      c       upper edge, the second is 0 for minimum and 1 for sum
              real thr(513),tmp(1024)
      c       temporary variables, tmp is the storage for the second
      c       window calculation in a type 1,3 case
              common/shrtcnv/iledge(100),iuedge(100),sbval(100),itp
              common/shrtnrm/snorm(100)
              common/typesig/itype
      c       shrt* are shortened convolution variables, including
      c       the setup stuff from strt.
              common/win/wind(1024)
              real wind1(1024),wind3(1024)
              save wind1,wind3
      c       window for fft
              common/blnk/or(513),ophi(513),dr(513),dphi(513)
              common/blk1/othr(513)
      c       for tonality calculations
              real alpha(513),tr(513),tphi(513),re(1024),im(1024)
              real beta(513),bcalc(513)
      c       more temp variables, undoubtedly a lot of these
      c       could be eliminated/reused
              common/absthr/abslow(513)
      c       absolute thresholds
              common/uniqid/hold(1024)
      c       could be real hold(512), save hold, as well. Doesn't
      c       communicate outside routine
              common/thresh/ithr(27),bval(513),rnorm(513)
              common/sigs/ifirst
      c       older setup variables. Still somewhat necessary.
              real nrg(512),ratio(512)
      c       half of the declarations are probably dregs.
      c       Especially those involved in the (former) long
      c       convolution
              ibp1=513
      c       index length for frequency domain for fft.
              xfmnorm=1.
      c       for ratio calculations is 1.0
              do i=1,1024-iblen,1
              re(i)=hold(i)
              end do
              do i=1025-iblen,1024,1
              re(i)=xtmp(i-1024+iblen)
              end do
              do i=iblen+1,1024,1
              hold(i-iblen)=re(i)
              end do
      c       recreate whole length of data block
      c       for variable shift of iblen
              do i=1,1024,1
              re(i)=re(i)*wind(i)
              im(i)=0.
              end do
      c       window and zero imag part
      c       write(*,*)re(511),re(512),re(513),re(514)
              call fptfft(1024,re,im,0)
      c       fptfft(length,real,rimag,1=reverse/0=forward)
              do i=1,ibp1,1
              r(i)=sqrt(re(i)*re(i)+im(i)*(i))
              if ( r(i) .gt. 0.0005 ) then
              phi(i)=atan2(im(i),re(i))
              else
              r(i)=.0005
              phi(i)=0
              end if
              end do
      c       calculate r and phi. Phi can be a few bits, probably
      c       even three might work, six to eight will be absolutely OK.
              do i=1,512,1
      c       write(*,*) i,r(i)
      c       end do
              if (ifirst .eq. 0) then
              do i=1,ibp1,1
              or(i)=0.
              othr(i)=1e20
              ophi(i)=0
              dr(i)=0
              dphi(i)=0
              end do
              ifirst=1
              end if
      c       setup for first time run. Can be done in initialization
      c       as well, needless to say, and then ifirst controls
      c       removed
      c       this subroutine figures out the new threshold values
      c       using line-by-line measurement.
```

LISTING 1

```
          do i=1,ibp1,1
          tr(i)=or(i)+dr(i)
          tphi(i)=ophi(i)+dphi(i)
    c     calculate predicted r and phi
          dr(i)=r(i)-or(i)
          dphi(i)=phi(i)-ophi(i)
    c     get new delta
          or(i)=r(i)
          ophi(i)=phi(i)
    c     store last value
    c     note, this is a polynominal predictor
          alpha(i)=sqrt((r(i)*cos(phi(i))-tr(i)*cos(tphi(i)))
         1 *(r(i)*cos(phi(i))-tr(i)*cos(tphi(i)))
         2 +(r(i)*sin(phi(i))-tr(i)*sin(tphi(i)))
         3 *(r(i)*sin(phi(i))-tr(i)*sin(tphi(i))))
         4 / ( r(i) +abs(tr(i)) +1.)
    c     alpha is the "chaos" metric
          beta(i)=alpha(i)
    c     now, beta is the unweighted tonality factor
          end do
    c     this is the shortened convolutional calculation
          do ii=1,itp,1
          sbeta(ii)=0.
          alpha(ii)=0.
          do i=iledge(ii),iuedge(ii),1
          alpha(ii) = alpha(ii) + r(i)*r(i)*xfmnorm
          sbeta(ii) = sbeta(ii) + r(i)*r(i)*beta(i)*xfmnorm
          end do
    c     i
          end do
    c     ii
    c     sum up chaos metric and energy for each partial
    c     cb now, alpha and sbeta can be used as before.
    c     except for sbeta already being weighted by rp^2
    c     this gets used almost like above, but with a few
    c     simplifications due to the weighting build-in
    cvdl  cncall
          do i=1,itp,1    sthr(i)=1.e-20 bcalc(i)=0.cvdl   cncall
          do j=1,itp,1
    c     glorch=sprdngf(sbval(j),sbval(i))
          glorch=spdf(i,j)
    c     sprdngf can be quantized to a table
    c     by .125 of a bark (difference between sbval(j),sbval(i),
    c     see sprdngf code, and then it can be tabled rather
    c     than calculated. Can also avoid doing convolution
    c     in cases where it's zero, amounting to about half
    c     of the work donehere.
          sthr(i)=alpha(j)*glorch+sthr(i)
          bcalc(i)=glorch*sbeta(j)+bcalc(i)
          end do
          bcalc(i)=bcalc(i)/sthr(i)
          end do
    c     that's the short convolution on the already combined
    c     data
          do i=1,itp,1
          bcalc(i)=max(bcalc(i),.05)
          bcalc(i)=min(bcalc(i),.5)
    c     sanity check
          bcalc(i)=-.43*alog(bcalc(i))-.299
          end do
    c     can be done as above, quantized, etc.
          do i=1,itp,1
          bcalc(i)=max(24.5,(15.5+sbval(i)))*bcalc(i)
         1 +5.5*(1.-bcalc(i))
          bcalc(i)=max(bcalc(i),bmax(sbval(i)+1))
    c     bmax is in critical bands so we have to use sbval to
    c     convert i to bark value
          bcalc(i)=exp((-bcalc(i)/10.)*alog(10.))
    c     again as above for long case
          sthr(i)=sthr(i)*snorm(i)*bcalc(i)
          end do
    cvdl  nodepchk   do ii=1,itp,1
          rn=(iuedge(ii)-iledge(ii)+1.)cvdl   nodepchk
          do i=iledge(ii),iuedge(ii),1
          thr(i)=sthr(ii)/rn
          end do
          end do
    c     above incantations spread out the threshold back into the
    c     real spectrum
          rpelev=32.
          rpmin=3.16e-3
          do i=1,ibp1,1
          thr(i)=max(thr(i),abslow(i))
          alpha(i)=thr(i)
          thr(i)=max( thr(i)*rpmin,min(thr(i),othr(i)*rpelev))
          end do
    c     do beginning of preecho control and absolute threshold
    c     this is where thr is the energy threshold
          do i=1,ibp1,1
          othr(i)=alpha(i)
          end do
    c     save old un-echo-compressed value.
    c     now, we must turn back into a ratio for
    c     MPEG system. bleah
          do i=1,npart,1
          nrg(i)=0
          if ( ipar(i,2) .eq. 0) then
          ratio(i)=1e30
          else
          ratio(i)=0
          end if
          pwidth=ipar(i,1)-ipar(i-1,1)+1
          do j=ipar(i-1,j),ipar(i,1)
          nrg(i)=nrg(i)+r(j)*r(j)
          if ( ipar(i,2) .eq. 0 ) then
    c     this is the low-freq case
          if (ratio(i) .gt. pwidth*thr(j)) ratio(i)=pwidth*thr(j)
          else
    c     here we can sum rather than take minimum
          ratio(i)=ratio(i)+thr(j)
          end if
          end do
          ratio(j)=nrg(i)/ratio(i)
    c     the factor of pwidthis because we calculated the minimum
    c     or mean noise, and the total noise in pwidth element
    c     vector. that converts mean back to sum, and minimum to
    c     pseudo-sum for the worst case spectrum
          ratio(i)=alog10(ratio(i))*10.
    c     this converts to dB (power ratio)
    c     in general, a negative ratio greater than -6 means
    c     that one can forget that band entirely
          end do
          return
          end
          function sprdngf(j,i)
          real i,j
          real sprdngf
    c     this calculates the value of the spreading function for
    c     the i'th bark, with the center being the j'th
    c     bark
          temp1=(i-j)*1.05
          if ( (temp1 .ge. .5) .and. (temp1 .le. 2.5) ) then
          x=temp1-.5
          x= 8.*(x*x-2*x)
          else
          x=0.
          end if
    c     the .95 is a hack for young people with no
    c     cochlear damage
          temp2=15.811389 +7.5*(temp1+.474)
          temp2=temp2- 17.5*sqrt(1.+(temp1+.474)*
         (temp1+.474) )
          if ( temp2 .le. -100. ) then
          temp3=0.
          else
          temp2=(x+temp2)/10.*alog(10.)
          temp3=exp(temp2)
          end if
          sprdngf=temp3
          return
          end
```

TABLE 1

Absolute Threshold File
("freqlist" for start-up routine)

| | | | | | | | | |
|---|---|---|---|---|---|---|---|---|
| 1 | | 56 | 3. | 111 | 16. | 166 | 16. | 221 | 50. |
| 2 | 27. | 57 | 4. | 112 | 17. | 167 | 16. | 222 | 50. |
| 3 | 18. | 58 | 4. | 113 | 17. | 168 | 16. | 223 | 50. |
| 4 | 16. | 59 | 5. | 114 | 17. | 169 | 16. | 224 | 50. |
| 5 | 10. | 60 | 5. | 115 | 17. | 170 | 16. | 225 | 50. |
| 6 | 9. | 61 | 5. | 116 | 18. | 171 | 17. | 226 | 50. |
| 7 | 8. | 62 | 6. | 117 | 18. | 172 | 17. | 227 | 50. |
| 8 | 8. | 63 | 6. | 118 | 18. | 173 | 17. | 228 | 50. |
| 9 | 8. | 64 | 6. | 119 | 18. | 174 | 17. | 229 | 50. |
| 10 | 8. | 65 | 6. | 120 | 18. | 175 | 17. | 230 | 50. |
| 11 | 8. | 66 | 7. | 121 | 18. | 176 | 17. | 231 | 50. |
| 12 | 7. | 67 | 7. | 122 | 18. | 177 | 18. | 232 | 50. |
| 13 | 7. | 68 | 7. | 123 | 18. | 178 | 18. | 233 | 50. |
| 14 | 7. | 69 | 8. | 124 | 17. | 179 | 18. | 234 | 60. |
| 15 | 7. | 70 | 9. | 125 | 17. | 180 | 18. | 235 | 60. |
| 16 | 7. | 71 | 10. | 126 | 16. | 181 | 18. | 236 | 60. |
| 17 | 7. | 72 | 10. | 127 | 16. | 182 | 19. | 237 | 60. |
| 18 | 7. | 73 | 10. | 128 | 16. | 183 | 19. | 238 | 60. |
| 19 | 7. | 74 | 10. | 129 | 16. | 184 | 19. | 239 | 60. |
| 20 | 7. | 75 | 10. | 130 | 15. | 185 | 19. | 240 | 60. |
| 21 | 7. | 76 | 10. | 131 | 15. | 186 | 19. | 241 | 60. |
| 22 | 7. | 77 | 10. | 132 | 15. | 187 | 20. | 242 | 60. |
| 23 | 7. | 78 | 10. | 133 | 15. | 188 | 21. | 243 | 60. |
| 24 | 7. | 79 | 10. | 134 | 14. | 189 | 22. | 244 | 60. |
| 25 | 6. | 80 | 10. | 135 | 14. | 190 | 23. | 245 | 60. |
| 26 | 5. | 81 | 11. | 136 | 13. | 191 | 24. | 246 | 60. |
| 27 | 5. | 82 | 11. | 137 | 12. | 192 | 25. | 247 | 60. |
| 28 | 5. | 83 | 11. | 138 | 12. | 193 | 26. | 248 | 60. |
| 29 | 5. | 84 | 1. | 139 | 12. | 194 | 27. | 249 | 60. |
| 30 | 5. | 85 | 11. | 140 | 12. | 195 | 28. | 250 | 60. |
| 31 | 4. | 86 | 12. | 141 | 12. | 196 | 29. | 251 | 60. |
| 32 | 4. | 87 | 12. | 142 | 12. | 197 | 30. | 252 | 60. |
| 33 | 4. | 88 | 12. | 143 | 12. | 198 | 31. | 253 | 60. |
| 34 | 4. | 89 | 12. | 144 | 13. | 199 | 32 | 254 | 60. |
| 35 | 4. | 90 | 12. | 145 | 13. | 200 | 33. | 255 | 60. |
| 36 | 3. | 91 | 12. | 146 | 14. | 201 | 34. | 256 | 60. |
| 37 | 3. | 92 | 13. | 147 | 14. | 202 | 35. | 257 | 60. |
| 38 | 3. | 93 | 13. | 148 | 14. | 203 | 36. | | |
| 39 | 3. | 94 | 13. | 149 | 14. | 204 | 37. | | |
| 40 | 2. | 95 | 13. | 150 | 14. | 205 | 38. | | |
| 41 | 2. | 96 | 13. | 151 | 14. | 206 | 39. | | |
| 42 | 1. | 97 | 13. | 152 | 14. | 207 | 40. | | |
| 43 | 1. | 98 | 14. | 153 | 14. | 208 | 41. | | |
| 44 | 1. | 99 | 14. | 154 | 14. | 209 | 42. | | |
| 45 | 1. | 100 | 14. | 155 | 14. | 210 | 43. | | |
| 46 | 0. | 101 | 14. | 156 | 15. | 211 | 44. | | |
| 47 | 0. | 102 | 15. | 157 | 15. | 212 | 45. | | |
| 48 | 0. | 103 | 15. | 158 | 15. | 213 | 46. | | |
| 49 | 0. | 104 | 15. | 159 | 15. | 214 | 47. | | |
| 50 | 0. | 105 | 15. | 160 | 15. | 215 | 48. | | |
| 51 | 0. | 106 | 15. | 161 | 15. | 216 | 49. | | |
| 52 | 2. | 107 | 16. | 162 | 15. | 217 | 50. | | |
| 53 | 2. | 108 | 16. | 163 | 15. | 218 | 50. | | |
| 54 | 2. | 109 | 16. | 164 | 15. | 219 | 50. | | |
| 55 | 3. | 110 | 16. | 165 | 15. | 220 | 50. | | |

TABLE 2 table of critical bands and fmin

| cb | top freq in band | width of band- 0 means width < 1/3 of critical band |
|---|---|---|
| 1 | 17 | 0 |
| 2 | 33 | 0 |
| 3 | 49 | 0 |
| 4 | 65 | 0 |
| 5 | 81 | 0 |
| 6 | 97 | 0 |
| 7 | 113 | 0 |
| 8 | 129 | 0 |
| 9 | 145 | 0 |
| 10 | 161 | 0 |
| 11 | 177 | 0 |
| 12 | 193 | 0 |
| 13 | 209 | 1 |
| 14 | 225 | 1 |
| 15 | 241 | 1 |
| 16 | 257 | 1 |
| 17 | 273 | 1 |
| 18 | 289 | 1 |
| 19 | 305 | 1 |
| 20 | 321 | 1 |
| 21 | 337 | 1 |
| 22 | 353 | 1 |
| 23 | 369 | 1 |
| 24 | 385 | 1 |
| 25 | 401 | 1 |
| 26 | 417 | 1 |
| 27 | 433 | 1 |
| 28 | 449 | 1 |
| 29 | 465 | 1 |
| 30 | 481 | 1 |
| 31 | 497 | 1 |
| 32 | 513 | 1 |

We claim:

1. A method for coding a physical, electrical, signal comprising the steps of:

receiving said electrical signal at an apparatus port;

separating said signal into band signals, where each band signal occupies a frequency band and where the collection of the band signals corresponds to said signal;

comparing the energy level of each of said band signals to a noise measure specified for the frequency band of each of said band signals;

selecting N band signalss that have the highest energy relative to the given noise measure for that frequency band;

coding the selected band signals; and delivering to an output port of said apparatus a physical, electrical, signal corresponding to the aggregate of the selected and coded band signals.

2. The method of claim 1 wherein said given noise measure of a frequency band relates to the perception of noise in that frequency band.

3. The method of claim 1 wherein said given noise measure of a frequency band is related to the energy level of just noticeable noise in that frequency band.

4. The method of claim 1 wherein said signal is an analog signal, said step of separating results in analog band signals, and said coding is digital coding.

5. The method of claim 4 wherein said digital coding concatenates the digital code of each of the analog band signals to form a steam of digital codes.

6. The method of claim 1 wherein said signal is an analog signal, and said step of coding includes down-shifting of the selected N bands to form a baseband signal.

7. The method of claim 6 wherein said step of separating results in analog band signals of substantially equal bandwidth, W, and said step of coding includes down-shifting of the selected N bands to form a baseband signal of bandwidth NW.

8. The method of claim 6 said step of coding encodes said baseband signal.

9. The method of claim 6 said step of coding encodes said baseband signal to digital form.

10. The method of claim 1 wherein said signal is an analog signal representing an image, and said step of separating separates said signal into two-dimensional spectrum bands.

11. The method of claim 1 wherein said signal is an analog signal representing a three dimensional image, and said step of separating separates said signal into spatial frequency 12. The method of claim 1 wherein said signal is an analog signal representing a sequence of images and said step of separating separates said signal into spatial frequency bands.

13. A method for modifying an analog signal comprising the steps of:

separating the signal into signals of distinct frequency bands to form band signals;

selecting N of said band signals characterized by a signal energy level in each of the N bands, relative to a threshold associated with each of the N bands, that is not lower than the signal energy level of the non-selected band signals relative to a threshold associated with each of the non-selected band signals, where N is a number such that the sum of bandwidths of the selected band signals does not exceed a preselected bandwidth; and down-shifting each of said N band signals to form N down-shifted band signal that occupy unique bands within a baseband having said preselected bandwidth, and outputting a single output signal that corresponds to the aggregate of the N down-shifted band signals.

14. The method of claim 13 wherein the threshold for each band signal is a given threshold associated with said each band.

15. The method of claim 13 wherein the threshold for each band signal is a given "just noticeable noise" energy threshold for said band signal.

16. The method of claim 15 wherein said step of selecting, is considering the selection of a band signal, subtracts the given just noticeable noise energy of band signal from the signal energy level of the band signal.

* * * * *